Figure 1:
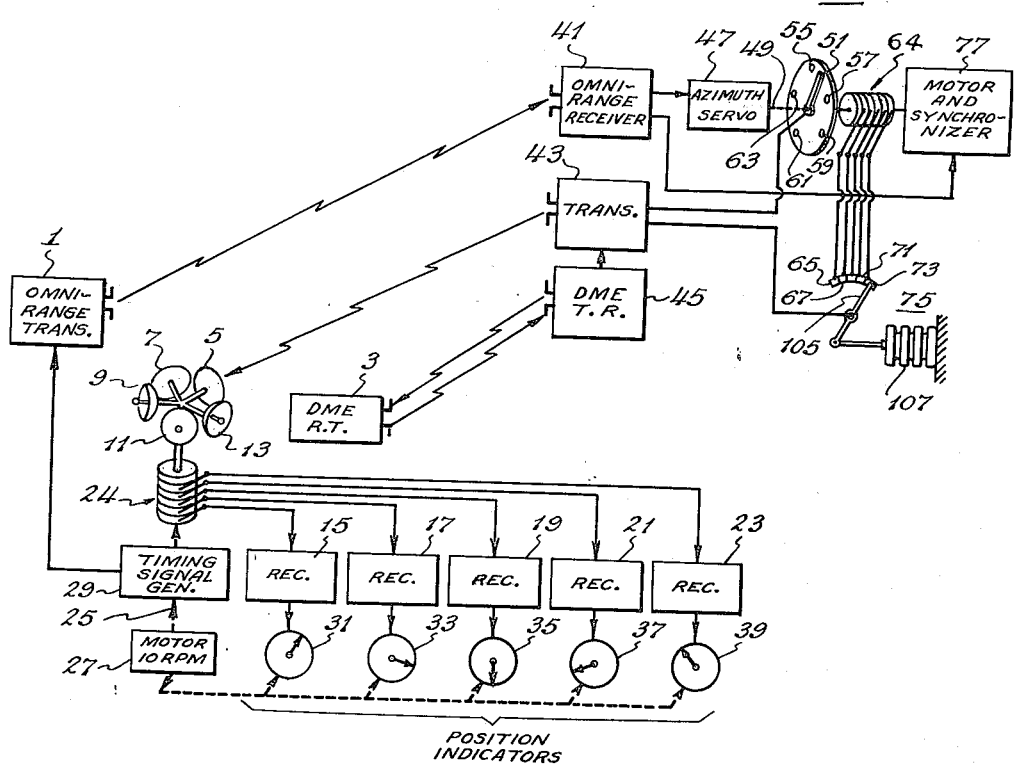

Sept. 22, 1953     G. B. LITCHFORD     2,653,314
AIR TRAFFIC CONTROL SYSTEM

Filed Dec. 21, 1949     2 Sheets-Sheet 1

INVENTOR
GEORGE B. LITCHFORD
BY
ATTORNEY

Sept. 22, 1953　　　　　G. B. LITCHFORD　　　　　2,653,314
AIR TRAFFIC CONTROL SYSTEM
Filed Dec. 21, 1949　　　　　　　　　　　　　　2 Sheets-Sheet 2
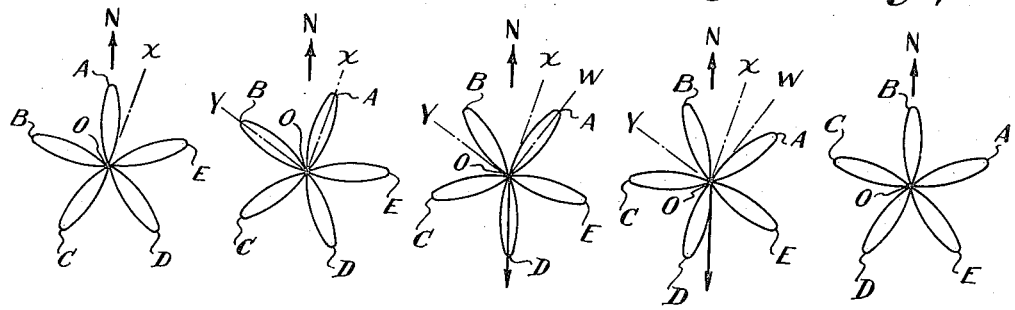
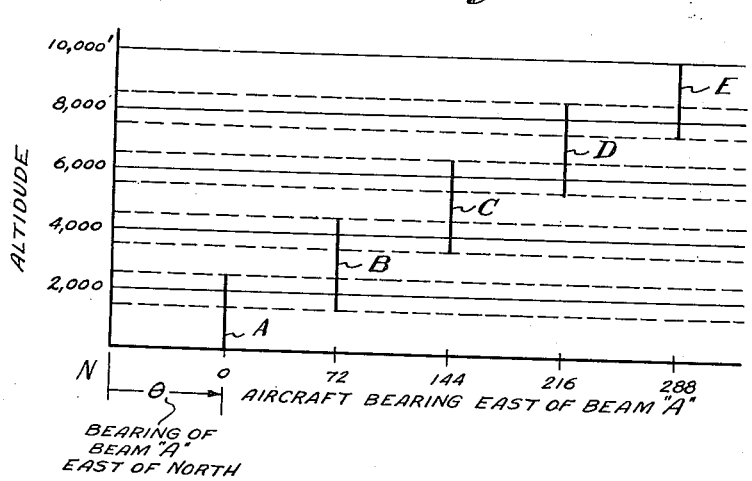
INVENTOR
GEORGE B. LITCHFORD
BY
Paul B. Hunter,
ATTORNEY Patented Sept. 22, 1953

2,653,314

UNITED STATES PATENT OFFICE 2,653,314

AIR TRAFFIC CONTROL SYSTEM

George B. Litchford, Cold Spring Harbor, N. Y., assignor to The Sperry Corporation, a corporation of Delaware Application December 21, 1949, Serial No. 134,314

8 Claims. (Cl. 343—106)

This invention relates to improvements in air traffic control systems, and particularly to systems for indicating the positions of aircraft in the airspace surrounding a control or reference station.

There are various known systems for indicating the plan position of an aircraft, i. e. its distance and direction from a reference point. However, a single indicator cannot ordinarily show also the third coordinate, altitude. It has been proposed to divide the airspace into a plurality of layers, and provide a separate plan indicator for each layer, with means on each aircraft for controlling the frequency of its transmissions to the reference station according to its altitude so that only the proper indicator is actuated.

Since it is essential that any useful traffic control system be able to handle a number of aircraft in its service area at the same time, economical use of the available spectrum is an important consideration. The procurement of distance and direction information in any one layer requires a certain bandwidth, and the assignment of different carrier frequencies to different aircraft, or even merely to different altitude layers, multiplies this bandwidth by the number of such assignments, overcrowding the allowed frequency band so as to limit seriously the traffic capacity of the system.

The aircraft transmissions may be coded or otherwise distinctively modulated according to altitude, but a transmission carrying such altitude-characteristic modulation requires a larger portion of the radio frequency spectrum than a similar transmission which is not so modulated. Thus the bandwidth problem is present regardless of the way in which the signals are made to differ.

The foregoing discussion about altitude information applies also to the communication of other information from the aircraft to the reference station. For example, it may be desirable to establish distance zones and separate the signals from various aircraft according to whether they are, say within one mile, from one to five miles, five to ten miles, or more than ten miles distant from the reference station. This and other similar arrangements normally require additional bandwidth more or less in proportion to the rate at which information is to be transmitted.

One of the principal objects of the present invention is to provide improved methods and means for communicating altitude layer or other zonal information in an air traffic control system, using azimuthal directivity instead of frequency difference or characteristic modulation to distinguish between transmissions from aircraft in different altitude layers or different zones.

It is a related object to provide systems of the described type wherein all aircraft may use the same or substantially the same relatively narrow portion of the radio frequency spectrum.

Another important object of the invention is to provide systems wherein the aircraft transmitter power requirements are relatively small, owing to possibility of using highly directive receiver means at the reference station.

Another object is to provide altitude separation means readily adaptable for combination with pre-existing two-coordinate (such as range and azimuth) position indicator systems.

Figure 2:
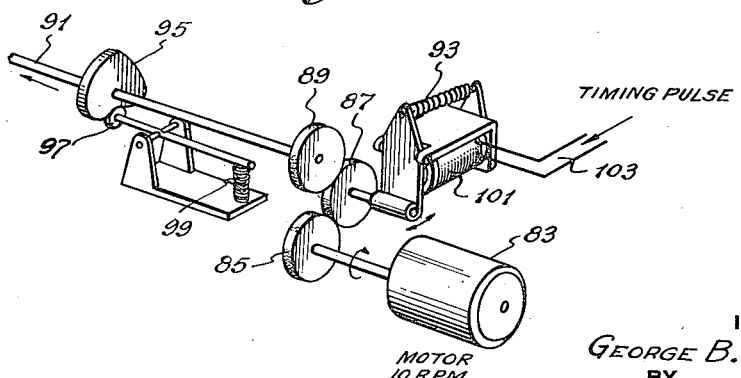

The invention will be described with reference to the accompanying drawings, wherein:

Fig. 1 is a schematic block diagram of a portion of an air traffic control system embodying the present invention, Fig. 2 is a perspective view of a synchronizing device which may be used as one of the elements of the system of Fig. 1, Figs. 3, 4, 5, 6 and 7 are polar diagrams of the directive reception pattern of the reference station of Fig. 1 at various instants during a cycle of operation, and Fig. 8 is a graph showing the relation between transmissions from aircraft in the different altitude layers, in the operation of the system of Fig. 1.

The lower left-hand portion of Fig. 1 represents the apparatus at a ground station or reference station, comprising an omni-directional radio range transmitter 1, distance measuring equipment (DME) 3, and a multiple receiver system including an assembly of directive antennas 5, 7, 9, 11 and 13 and corresponding receivers 15, 17, 19, 21 and 23 connected to the respective antennas through rotatable means such as slip rings 24.

The receivers may be identical, and arranged to respond to signals of the same frequency. The directive antennas may also be alike, but are disposed with their axes in different directions, preferably at equal angular intervals throughout the 360 degrees of azimuth. Each antenna may include a paraboloidal reflector or "dish," designed to provide a relatively narrow-beam response pattern.

The whole antenna assembly is supported for rotation as a unit about the vertical axis of a shaft 25 which is coupled to a motor 27. The motor 27 is arranged to rotate the shaft 25 at a nominally constant speed of say 10 R. P. M. A timing signal generator 29 is also driven by a shaft 25 to provide a synchronizing pulse or similar signal identifying the instant when one of the antennas, for example the antenna 5, points in a reference direction such as north. The generator 29 may comprise a low-frequency oscillator and a switch driven by a cam on the shaft 25 to apply the output of the oscillator to the transmitter 1 momentarily.

The omni-directional radio range transmitter 1 includes all of the apparatus of such a transmitter system, that is, an antenna providing a rotating limacon-like directive pattern, the transmitter itself, and suitable reference phase generator means. One such system is described in copending U. S. application Serial No. 782,722, filed October 29, 1947, by George B. Litchford and Joseph Lyman, entitled "Omni-Azimuth Guidance System," now Patent No. 2,564,703, issued August 21, 1951. The timing signal from the generator 29 may be applied simply as an additional modulation upon the transmitter.

The DME 3 is a so-called "transponder" of any type known to those skilled in the art, and comprises a receiver responsive to transmissions from aircraft whose distance is to be measured, and a transmitter energized from the receiver to retransmit to the aircraft involved.

A plurality of position indicator devices 31, 33, 35, 37 and 39 are connected to the receivers 15, 17, 19, 21 and 23 respectively. The position indicators may be of the polar facsimile recorder type described in copending U. S. application Serial No. 782,848, filed October 29, 1947, by Joseph Lyman et al. and entitled "Craft Position Plotting System." The rotary scanning arms of the indicators are driven by the motor 27 and are oriented with respect to each other like the corresponding directive antennas 5, 7, 9, 11 and 13.

The equipment at an aircraft station is shown in the upper right-hand portion of Fig. 1 and includes an omni-directional radio range receiver 41, the transmitter 43 and distance measuring equipment 45. The DME 45 may be of the type described in co-pending U. S. application Serial No. 88,522, filed April 20, 1949, by Joseph Lyman et al. and entitled "Air Traffic Control Systems," now Patent No. 2,616,076, issued October 28, 1952. The unit 45 includes a variable frequency oscillator or the like and a servo mechanism for controlling the frequency thereof as a function of the distance, as described in said last-mentioned copending application. The variable frequency output of the DME 45 modulates the transmitter 43.

The omni-directional radio range receiver 41 includes the necessary demodulator and phase detector elements for providing a control signal output which corresponds to the direction of the aircraft station from the reference station. This is applied to a servomotor 47 whose output shaft 49 is thereby positioned angularly according to the direction. A switch arm 51 is provided on the shaft 49 in cooperative relationship with a contact assembly 53.

The assembly 53 comprises an insulating plate supporting a plurality of spaced contacts 55, 57, 59, 61 and 63 each corresponding to one of the multiple receiver channels at the reference station. These contacts are connected through a ring arrangement 64 to corresponding contacts 65, 67, 69, 71 and 73 of a tap switch 75. The assembly 53 and slip rings 64 are supported for rotation coaxially with the arm 51 by the shaft of a motor 77. The motor 77 is designed to rotate at the same speed as the motor 27 at the reference station and includes a synchronizing device responsive to the timing signals received from the ground station to maintain or periodically reset the assembly 53 at an angular position corresponding to that of the antenna assembly at the reference station.

Fig. 2 shows a suitable synchronizing system, including friction drums 85, 87 and 89 connecting a constant speed motor 83 to a shaft 91. The drum 87 is an idler and is normally maintained in contact with the drums 85 and 89 by means of a tension spring 93. The shaft 91 carries a heart-shaped cam 95 which is engaged by a cam follower 97 under the influence of a spring 99. An electromagnet 191 is arranged to displace the idler 87 and interrupt the drive train in response to a momentary timing pulse applied to its terminals 103. When this occurs, the shaft 91 is rotated by the action of the cam follower 97 against the cam 95 to an index position, corresponding to the position of the motor shaft 25 at the reference station when the timing pulse is produced.

Returning to Fig. 1, the tap switch 75 is provided with an arm 105 which is connected to an altitude responsive element such as an aneroid capsule 107. The arm 105 and the arm 51 are connected to a control circuit of the transmitter 43 like a key, in such manner that the transmitter is inoperative except when said arms are connected together by way of one of the contacts on the assembly 53, a slip ring 64, and the corresponding contact on the tap switch 69.

In the operation of the described system, the motor 27 rotates the receiver antenna assembly continuously in azimuth at 10 R. P. M. The motor 77 at the aircraft station similarly rotates the contact assembly 53. The timing signal from the generator 29 synchronizes the contact assembly 53 with the antenna assembly in such manner that each of the contacts is always in an angular position, with respect to some reference line, which corresponds to the angular position of the respective antenna at the ground station with respect to north. The azimuth servomotor 47, in response to the output of the omni-directional range receiver 41, maintains the contact arm 51 at an angle with respect to the reference line which corresponds to the bearing of the aircraft station from the reference station. Accordingly, the arm 51 engages the contact 55 at the instant the beam of the antenna 5 is pointed toward the airborne station. A short time later (1⅕ seconds, assuming that five channels are used, as shown), the antenna 7 points toward the airborne station and the arm 51 touches the contact 57. Similarly, the contacts 59, 61 and 63 are engaged in succession at the instants when the corresponding antennas 9, 11 and 13 are directed at the aircraft station. This operation occurs regardless of the direction of the aircraft from the reference station, because the arm 51 is always at an angular position corresponding to said direction.

The contacts of the tap switch 75 are assigned to different altitude layers, for example 0–2000 feet for the contact 65, 2000 to 4000 feet for the contact 67, and so on. The widths and positions of the contacts are such that the arm 105 is maintained by the altitude responsive device 107 on the contact corresponding to the altitude layer in which the aircraft is flying.

When the aircraft station is in the 0–2000 foot layer, the arm 105 engages the contact 65. Each time the contact 55 on the assembly 53 passes the arm 51, the transmitter keying circuit is completed through the arm 51, contact 55, one of the slip rings 64, contact 65 and the arm 105. The transmitter 43 is keyed on for a short time, perhaps 1/60 second, as the beam of the antenna 5 sweeps past the airborne station.

The transmitted pulse is received only on the antenna 5, since the other antennas are pointed in different directions, and the receiver 15 is the only one which responds to the transmitter 43. Any other aircraft stations like that in Fig. 1 which are also in the 0–2000 foot layer will transmit similarly only when the antenna 5 points toward them. The indicator 31, being connected to the receiver 15, thus shows the positions of aircraft in the 0–2000 foot layer. Similarly, the indicators 33, 35, 37 and 39 will show the positions of craft in the 2000–4000, 4000–6000, 6000–8000, and 8000–10,000 foot layers respectively.

Fig. 3 shows a plan view of the directive patterns of the receiving antennas at the reference station when the antenna 5 points due north. The beams of the antennas 5, 7, 9, 11 and 13 are denoted in Fig. 3 and in Figs. 4, 5, 6 and 7 as A, B, C, D and E, respectively. An aircraft station bearing along the line O—X in Fig. 3 will not transmit, regardless of its altitude, and would not be received if it did transmit, since no receiving antenna is directed toward it.

In Fig. 4, the beam A has rotated clockwise or eastward to coincide with the line O—X. Now an airborne station on this line will transmit, and be received on the beam A, if it is in the altitude layer "A" (0–2000 feet), but not if it is in any other layer. At the same instant, the beam B lies on the line O—Y, and an aircraft in this direction, and in the layer "B" (2000–4000 feet) will transmit, and be received on the beam B. It should be noted that although the transmissions from aircraft at X and Y are simultaneous, and at the same frequency, they cannot interfere with each other because they are picked up by the separate directive antennas 5 and 7 and applied to the separate receivers 15 and 17.

Fig. 5 shows the beam A rotated to lie on the line O—W. At this instant, an aircraft station on the line O—W and in the first altitude layer will transmit, while aircraft at X and Y will not. At the same time, an aircraft in layer D and on the line O—V will transmit, being received by the receiver 21. Fig. 6 shows the patterns at a position where none of the lines through V, W, X and Y coincide with a beam. In Fig. 7, the pattern has rotated still further, so that the beam B now points north.

When two ore more aircraft are in exactly the same direction from the reference station, and in the same altitude layer, they will transmit simultaneously and be received by the same receiver. Generally they will be at different distances, and their signals will be distinguishable because the distance-characteristic modulations produced by the respective distance measuring equipment 45 will be different.

It is possible for two aircraft to be at the same distance and bearing from the reference station, and also in the same altitude layer. However, such a condition is one which usually would not be allowed to occur in the normal operation of a traffic control system. Moreover, it will be apparent that this state of affairs could not ordinarily persist for more than a few seconds except in the case of aircraft flying in the same direction at the same speed, as in formation flying.

Since an aircraft flying near the bottom of one altitude layer might actually be at substantially the same altitude as a craft near the top of the next lower layer, it is desirable, when an aircraft is near the boundary between two layers, to show its position on both of the position indicators corresponding to the two layers. This may be done by extending the actual boundaries of the layers beyond the nominal boundaries by, say 500 feet. As shown in Fig. 8, the 0–2000 foot layer "A" covers up to 2500 feet. Layer "B" goes from 1500 feet to 4500 feet, and so on.

An aircraft at bearing $\theta$ from the reference station, and at an altitude between 1500 feet and 2500 feet, will transmit when beam "A" points toward it, and will transmit again when beam "B" points toward it, and thus its position will be shown on both indicators 31 and 33. Thus any two aircraft whose altitude difference is 1000 feet or less will be shown on the same positional display. The required overlapping of altitude layers may be effected simply by making the contact portion of the arm 105 of the tap switch 75 (Fig. 1) of sufficient width to overlap two adjacent tap contacts by an amount corresponding to the desired altitude layer overlap. Alternatively, the arm 105 may be provided with two contacts connected together and spaced apart by the required amount.

It will be evident that the depths or thicknesses of the altitude layers need not be equal as shown, but may be made different by making the contacts 65, 67, 69, 71 and 73 of different widths. The uppermost layer may be extended to include all altitudes above 8000 feet for example, by providing a stop to prevent the arm 105 from moving beyond the contact 73. More or fewer layers may be provided by using more or fewer contacts on the switches 75 and 53 with a corresponding number of directive receiver channels and indicators.

Although the invention has been described as embodied in a system affording separation of aircraft signals according to the altitude layer where they originate, it will be apparent that the separation may be made to depend upon something else, such as distance, heading, airspeed or other information simply by substituting a correspondingly responsive element for the aneroid capsule 107. Also, the switch 75 may be made manually operable so that it can be set arbitrarily or moved to communicate information such as identification to the reference station.

Two or more systems like that of Fig. 1 may be combined, using different carriers as distinctive modulations, but nevertheless retaining the advantages of requiring less bandwidth and less aircraft transmitter power than are necessary when modulation or coding alone is used.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An air traffic control system or the like, including at a reference station directive antenna means having at least one response pattern in the form of a narrow beam, receiver means coupled to said antenna, means for rotating said beam in azimuth, a timing signal generator coupled to said beam rotating means for providing a timing signal to define the instants when said beam points in a reference direction such as north, a transmitter, and means for applying said timing signal to said transmitter; an aircraft station including a receiver for reproducing said timing signal, an altimeter, a transmitter and a switch coupled to said receiver and said altimeter and connected to said transmitter to key said transmitter at the instants said beam points at said aircraft station only when said aircraft is within a predetermined altitude layer.

2. An air traffic control system including at a reference station a plurality of indicator devices, each assigned to a respective altitude layer of the space surrounding said station, a plurality of receivers connected respectively to said indicators, a plurality of angularly spaced beam antennas connected respectively to said receivers, means for rotating said antennas to sweep in azimuth and a timing signal generator coupled to said means for producing a timing signal defining the instants when one of said beams points in a reference direction; an aircraft station including a normally non-operative transmitter, azimuth determining means, an altimeter, and switch means coupled to said azimuth determining means and to said altimeter, and connected to said transmitter to operate said transmitter momentarily at instants when the beam corresponding to the indicator assigned to the altitude layer containing said aircraft station is directed at said aircraft station.

3. A radio air traffic control system including at a reference station directive antenna means providing a plurality of directive patterns each in the form of a narrow beam and each assigned to a respective altitude layer, said beams being oriented in different azimuthal directions radially from said reference station, receiver means connected to said antenna means, means for rotating said antenna means to make said beams sweep successively in azimuth, a timing signal generator coupled to said antenna rotating means, and a transmitter connected to said timing signal generator, an aircraft station including a receiver for reproducing said timing signal, azimuth determining means responsive to the direction of said aircraft station from said reference station, a transmitter, an altimeter, and switch means coupled to said timing means, said azimuth determining means and to said altimeter and connected to said transmitter to operate said transmitter periodically at instants coinciding with the passages of the one of said beams corresponding to the layer containing said aircraft station through the line between said reference station and said aircraft station.

4. A radio air traffic control system including at a reference station a plurality of directive antennas, each having a directive pattern in the form of a narrow beam, said antennas being oriented with respect to each other with their respective beams pointing in different azimuthal directions radially from said reference station, a plurality of receivers, each connected to one of said antennas, means for rotating said antennas together continuously at a nominally constant speed to make said beams sweep successively in azimuth, a timing signal generator coupled to said antenna rotating means, and a transmitter connected to said generator, an aircraft station including a receiver, a shaft and means coupled to said receiver for rotating said shaft in synchronism with the rotation of one of said antennas, a second shaft and means including a direction finder coupled to said second shaft for maintaining said second shaft in an angular position corresponding to the direction of said aircraft station from said reference station, a transmitter, an altimeter, and switch means connected to said transmitter and coupled to said two shafts and to said altimeter to operate said transmitter periodically at instants delayed with respect to the attainment of positional agreement between said shafts by an interval depending upon the altitude of said aircraft station, said interval being an integral multiple of the period between the passages of successive ones of said beams through the line between said reference station and said aircraft station.

5. Mobile station equipment for cooperation with a reference station of the type which includes an omnidirectional radio range transmitter, a plurality of receivers with respective azimuthally spaced directive beam antennas, driving means for rotating said antennas as a unit in azimuth, and a timing signal generator coupled to said driving means and connected to said transmitter, said mobile station equipment comprising an omnidirectional radio range receiver adapted to respond to said reference station transmitter to produce an output representative to the bearing of said mobile station from said reference station and another output corresponding to said timing signal, a selector switch device having a plurality of terminals corresponding respectively to said reference station receivers and a further terminal selectively connectable to said plurality of terminals, means connected to said omnidirectional radio range receiver for actuating said switch in response to said bearing-representative output and said timing signal output to connect said further termial thereof to the corresponding one of said plurality of terminals at the instant each respective one of said reference station beam antennas is directed toward said mobile station, and means connecting said further terminal and a selected one of said plurality of terminals to said transmitter to key it on substantially only when the corresponding reference station antenna beam points at said mobile station.

6. The invention set forth in claim 5, further including an altimeter, and a second selector switch coupled to said altimeter to be actuated thereby to select one of said further terminals of said first switch in accordance with the altitude of said mobile station.

7. The invention set forth in claim 6, further including radio distance measuring equipment adapted to cooperate with responder equipment at said reference station to produce at said mobile station an output representative of the distance of said mobile station from said ground station, and means for modulating said mobile station transmitter with said output.

8. Reference station equipment for an air traffic control system, comprising an omnidirectional radio range transmitter, a plurality of position indicators, each assigned to a respective altitude layer of the space surrounding said reference station, a plurality of receivers, each connected to a respective one of said indicators, and a plurality of directive beam antennas, said antennas being angularly displaced at spaced intervals of azimuth and each connected to a respective one of said receivers; a motor coupled to said antennas for rotating all of said antennas in azimuth as a unit, a timing signal generator and means for driving said generator in correspondence with the rotation of said antennas, said timing signal generator being coupled to said radio range transmitter to modulate said transmitter according to said antenna rotation.

GEORGE B. LITCHFORD.

References Cited in the file of this patent

UNITED STATES PATENTS

| Number | Name | Date |
|---|---|---|
| 2,252,083 | Luck | Aug. 12, 1941 |
| 2,480,123 | Deloraine et al. | Aug. 30, 1949 |
| 2,505,314 | Wallace | Apr. 25, 1950 |
| 2,534,843 | Wallace | Dec. 19, 1950 |
| 2,535,107 | Wallace | Dec. 26, 1950 |
| 2,538,065 | Wallace | Jan. 16, 1951 |